(12) United States Patent
Brown et al.

(10) Patent No.: US 10,556,518 B2
(45) Date of Patent: Feb. 11, 2020

(54) IMPROVEMENTS RELATING TO AUTOMOTIVE BULKHEADS

(71) Applicant: JAGUAR LAND ROVER LIMITED, Whitley, Coventry, Warwickshire (GB)

(72) Inventors: Christopher Brown, Leamington Spa (GB); Matthew Atkinson, North Ferriby (GB); James Hosegood, Coventry (GB); Mark Cockram, Birmingham (GB)

(73) Assignee: JAGUAR LAND ROVER LIMITED, Whitley Coventry (GB)

(*) Notice: Subject to any disclaimer, the term of this patent is extended or adjusted under 35 U.S.C. 154(b) by 0 days.

(21) Appl. No.: 15/737,664

(22) PCT Filed: Jun. 13, 2016

(86) PCT No.: PCT/EP2016/063481
§ 371 (c)(1),
(2) Date: Dec. 18, 2017

(87) PCT Pub. No.: WO2016/202733
PCT Pub. Date: Dec. 22, 2016

(65) Prior Publication Data
US 2018/0186250 A1 Jul. 5, 2018

(30) Foreign Application Priority Data
Jun. 19, 2015 (GB) .................................... 1510800

(51) Int. Cl.
*B60N 2/02* (2006.01)
*B60N 2/20* (2006.01)
*B60N 2/30* (2006.01)

(52) U.S. Cl.
CPC ........... *B60N 2/0232* (2013.01); *B60N 2/206* (2013.01); *B60N 2/3011* (2013.01); *B60N 2/3088* (2013.01)

(58) Field of Classification Search
CPC ........ B60N 2/0232; B60N 2/206; B60N 2/30; B60N 2/3011; B60N 2/3088; B60R 21/026
See application file for complete search history.

(56) References Cited

U.S. PATENT DOCUMENTS 6,896,308 B2    5/2005  Okanda et al.
7,077,455 B2    7/2006  Guillez et al.
(Continued)

FOREIGN PATENT DOCUMENTS

CN     1572598 A      2/2005
CN     103318091 A    9/2013
(Continued)

OTHER PUBLICATIONS

Combined Search and Examination Report for application No. GB1510800.4, dated Dec. 21, 2015, 7 pages.
(Continued)

*Primary Examiner* — Lori L Lyjak
(74) *Attorney, Agent, or Firm* — Reising Ethington P.C.

(57) ABSTRACT

The present invention resides in a bulkhead assembly for a passenger vehicle, wherein the bulkhead assembly comprises a powered linkage assembly for reconfiguring the bulkhead assembly between a folded configuration and an unfolded configuration. The bulkhead assembly is configurable to separate a passenger compartment and a luggage compartment of the passenger vehicle. The bulkhead assembly separates the passenger compartment and the luggage compartment in the unfolded configuration.

19 Claims, 17 Drawing Sheets

(56) References Cited

U.S. PATENT DOCUMENTS

| | | | |
|---|---|---|---|
| 8,985,665 B2* | 3/2015 | Aschaber | B60N 2/32 |
| | | | 296/24.43 |
| 9,358,906 B2 | 6/2016 | Taylor et al. | |
| 2004/0195892 A1 | 10/2004 | Daniels | |
| 2004/0256894 A1* | 12/2004 | McManus | B60N 2/06 |
| | | | 297/93 |
| 2005/0168035 A1 | 8/2005 | Boudinot | |
| 2007/0114824 A1* | 5/2007 | Mendis | B60N 2/206 |
| | | | 297/238 |
| 2008/0185866 A1 | 8/2008 | Tarrant et al. | |
| 2011/0062737 A1 | 3/2011 | Kroener | |
| 2013/0168994 A1 | 7/2013 | Yamamoto et al. | |
| 2013/0207428 A1 | 8/2013 | Aschaber et al. | |
| 2013/0249232 A1 | 9/2013 | Dinger et al. | |
| 2014/0327284 A1 | 11/2014 | Taylor et al. | |
| 2018/0043801 A1* | 2/2018 | Lambertz | B60N 2/366 |

FOREIGN PATENT DOCUMENTS

| | | | |
|---|---|---|---|
| CN | 104114405 A | | 10/2014 |
| DE | 102006058475 A1 | | 7/2008 |
| DE | 102010022206 A1 | | 11/2011 |
| EP | 1462319 A1 | | 9/2004 |
| EP | 1902898 A2 * | 3/2008 | B60N 2/206 |
| EP | 2626236 A1 | | 8/2013 |
| FR | 2663270 A1 | | 12/1991 |
| FR | 2834951 A1 | | 7/2003 |
| FR | 2845954 A1 | | 4/2004 |
| FR | 2906197 A1 | | 3/2008 |
| FR | 2907396 A1 | | 4/2008 |
| FR | 2918935 A3 | | 1/2009 |
| FR | 2923188 A1 | | 5/2009 |
| FR | 2977211 A1 | | 1/2013 |
| FR | 3010021 A1 | | 3/2015 |
| JP | 2006327409 A | | 12/2006 |
| JP | 2008189060 A | | 8/2008 |
| JP | 2012131353 A | | 7/2012 |
| JP | 5017879 B2 | | 9/2012 |
| JP | 2013166543 A | | 8/2013 |

OTHER PUBLICATIONS

International Search Report for International application No. PCT/EP2016/063481, dated Sep. 27, 2016, 7 pages.
Written Opinion for International application No. PCT/EP2016/063481, dated Sep. 27, 2016, 5 pages.
Chinese Office Action corresponding to CN application No. 2017565811, dated Dec. 4, 2018, 7 pages.
Chinese Office Action with English translation corresponding to CN application No. 201680035972.1, dated Aug. 1, 2019, 20 pages.
Chinese Search Report corresponding to CN application No. 201680035972.1, dated Jul. 17, 2019, 2 pages.

* cited by examiner

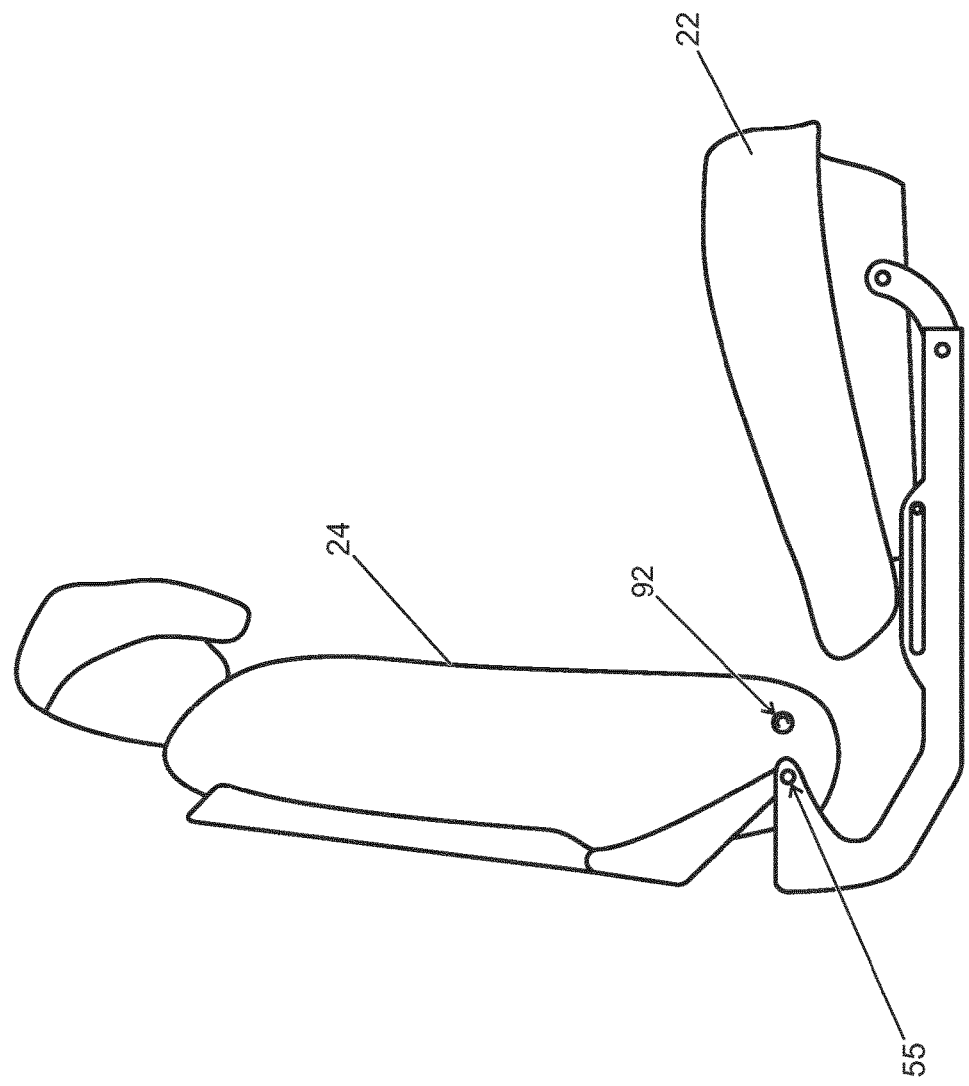

IMPROVEMENTS RELATING TO AUTOMOTIVE BULKHEADS

TECHNICAL FIELD

The present disclosure relates to improvements to automotive bulkheads. In particular, but not exclusively, the disclosure relates to the bulkhead assembly that separates the passenger compartment from the luggage compartment of an automobile. Aspects of the invention relate to a bulkhead assembly, a control system for controlling a bulkhead assembly, a vehicle comprising a bulkhead assembly and/or a control system, and a method of operating a bulkhead assembly.

BACKGROUND

The large amount of space available in standard sport utility vehicles (SUVs) allows users of such vehicles to reconfigure the seating in those vehicles to carry passengers or large loads. However, the ability to reconfigure the seating in luxury SUVs, and other luxury vehicles is often compromised as the seats are often more bulky than those used in standard passenger cars as they are optimised for comfort over versatility. The materials and components used in the seating of luxury vehicles does not readily allow reconfiguration of the seating of a luxury vehicle. As a consequence, luxury vehicles are traditionally viewed as unsuitable for carrying large loads. In particular, it is typically not possible to easily fold the rear seats in a luxury vehicle to increase the load space available in the vehicle.

The inability to reconfigure the seats in a luxury vehicle limits the versatility of such vehicles and prevents the users of luxury vehicles from carrying large loads. The present invention aims to improve upon known vehicle seating, to enable the easy reconfiguration of the rear seats of a passenger vehicle, in particular a luxury saloon car or luxury SUV, to enable greater vehicle versatility and the carrying of large loads by the passenger vehicle.

SUMMARY OF THE INVENTION

Aspects and embodiments of the invention provide a bulkhead assembly, a control system for controlling a bulkhead assembly, a vehicle comprising a bulkhead assembly and/or a control system, and a method of operating a bulkhead assembly.

According to an aspect of the invention, there is provided a bulkhead assembly for a passenger vehicle. The bulkhead assembly may comprise a collapsible bulkhead arranged to separate a passenger compartment and a luggage compartment of a passenger vehicle. The bulkhead assembly comprises a powered linkage assembly for reconfiguring the bulkhead assembly between a folded configuration and an unfolded configuration. In the unfolded configuration the bulkhead may be located between the passenger compartment and the luggage compartment of the passenger vehicle. The bulkhead assembly may separate the passenger compartment and the luggage compartment in the unfolded configuration.

The passenger vehicle may be an automobile, which is commonly referred to as a car, such as a saloon or SUV. The bulkhead assembly may form part of a rear seating assembly of the passenger vehicle. The rear seating assembly may be split into two or more portions, for example a major portion and a minor portion.

The bulkhead assembly according to an aspect of the invention enables the seating configuration of a passenger vehicle to be easily reconfigured between (i) a seating configuration, also referred to as an unfolded configuration, wherein one or more of the rear seats may be used as passenger seats; and (ii) a stowed configuration, also referred to as a folded configuration, wherein one or more of the rear seats are folded to increase the effective loadspace of the vehicle. In the folded configuration the passenger compartment may be accessed via the luggage compartment.

The bulkhead assembly may comprise an upper support structure, and/or a lower support structure, and/or a bulkhead. In the unfolded configuration a bulkhead may form a partition between a passenger compartment and a luggage compartment of a passenger vehicle. In the folded configuration the bulkhead may protect the bulkhead assembly or one or more seats from damage by loads carried in the increased load space of the vehicle.

The bulkhead assembly may comprise a seat backrest. The bulkhead assembly may also comprise a seat cushion. The seat cushion may be slidably reconfigurable between a rear seating position for carrying a passenger and a forward stowed position for accommodating at least a portion of a seat backrest.

The seat backrest may be movable with respect to the bulkhead. The seat backrest and the bulkhead may be arranged so that upon reconfiguration of the seating configuration from the unfolded configuration to the folded configuration the backrest moves to an initial position with respect to the bulkhead. This feature provides the advantage that regardless of the recline position set by the user of the vehicle, the backrest will move to the correct position to allow reconfiguration to take place.

The powered linkage assembly may comprise a driveshaft for driving the bulkhead assembly. Rotation of the driveshaft in one direction switches the bulkhead assembly from the folded configuration to the unfolded configuration, and rotation of the driveshaft in the opposite direction switches the bulkhead assembly from the unfolded configuration to the folded configuration.

The upper support structure and/or the bulkhead may have first positions relative to the lower support structure in the folded configuration, and the upper support structure and/or the bulkhead may have second positions relative to the lower support structure in the unfolded configuration. In an embodiment of the invention, the lower support structure is fixed to the chassis of the vehicle, and the upper support structure and/or the bulkhead move relative to the lower support structure.

The upper support member and the lower support member may be pivotally coupled so that they each pivot about the same point or axis.

The powered linkage assembly may be arranged to reconfigure the relative positions of the upper support structure and/or the bulkhead with respect to the lower support structure. The powered linkage assembly may comprise an engagement member engaged with the upper support structure or the lower support structure. The position of the linkage assembly may relate to the relative positions of the upper support structure and/or the bulkhead with respect to the lower support structure.

The engagement member may comprise a first radius portion which may be located in and/or engaged with a complementary receiving portion in the upper support structure or lower support structure. The engagement member may generally be in the form of a disk. The engagement member may comprise a second radius portion. The second radius portion may be larger than the first radius portion. The engagement member may comprise an elongate portion. The elongate portion may form a crank which cranks the upper support structure or the lower support structure.

A connecting member may connect the engagement member to the lower support structure or the upper support structure. The connecting member and the engagement member may be arranged to adjust the position of the lower support structure and the upper support structure relative to each other.

The engagement member may be arranged to crank or drive the connecting member in order to adjust the relative position of the lower support structure and/or the upper support structure. The connecting member may be a rod or may be a bar. The connecting member may be pivotally connected to the engagement member and/or pivotally connected to the upper support structure or the lower support structure.

The powered linkage may comprise a motor for driving the linkage. The motor may be an electric motor. The motor may be arranged to be activated by a user of the vehicle.

According to a further aspect of the invention, there is provided a control system for controlling a bulkhead assembly as described herein.

According to another aspect of the invention, there is provided a vehicle comprising a bulkhead assembly and/or a control system as described herein.

According to a further aspect of the invention there is provided a method of controlling a bulkhead assembly to move or switch between a folded configuration and an unfolded configuration. The method comprises activating a powered linkage. The method may comprise moving a seat backrest to an initial position relative to a bulkhead. Thereby enabling reconfiguration to take place.

The various embodiments of the invention provide a powered bulkhead assembly that separates the passenger compartment from a luggage compartment in a passenger vehicle, which enables a user of the vehicle to quickly and easily increase the loadspace of the vehicle. This is particularly advantageous in sports utility vehicles and luxury saloons, which are typically considered not suitable for carrying large loads.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which:

FIGS. 13a to 13e are schematic diagrams of a side view of a rear seating assembly, which illustrate a method of operation according to an embodiment of the invention.

DETAILED DESCRIPTION

Figure 1:
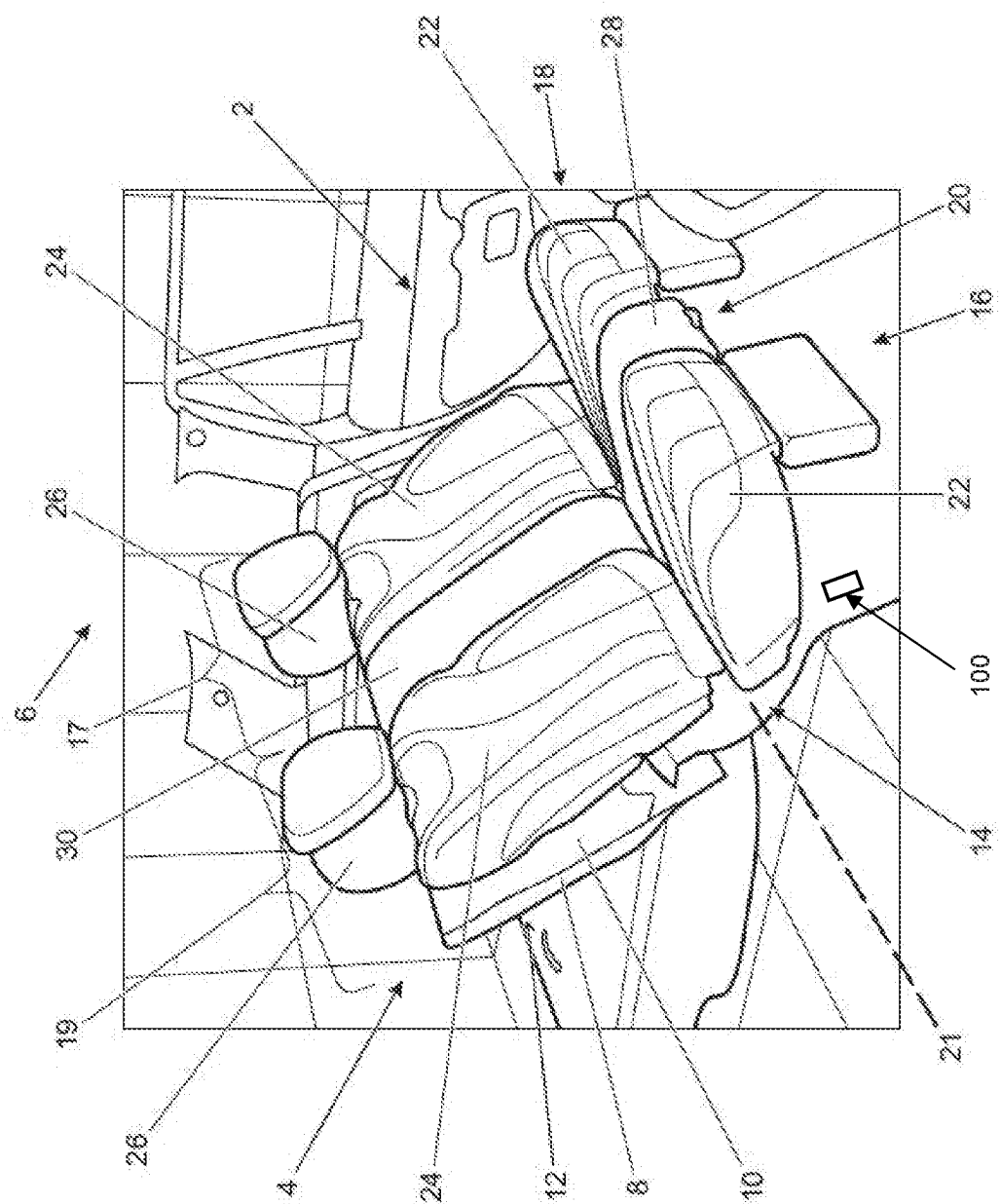
FIG. 1 is a schematic diagram of the luggage compartment and rear portion of the passenger compartment of a sports utility vehicle (SUV), wherein the rear seating arrangement is in an unfolded configuration.

FIG. 1 shows the rear portion of a passenger compartment 2 and a luggage compartment 4 of a sport utility vehicle (SUV) 6. The terms "forwards", "backwards", "forwardmost" and "rearmost" are used to describe positions or locations of features relative to the SUV 6. For example, the terms "forwards" and "forwardmost" refer to locations or positions towards or nearer the front of the SUV 6, and "backwards" and "rearmost" refer to locations or positions towards or nearer the rear of the SUV 6.

The passenger compartment 2 is separated from the luggage compartment 4 by a bulkhead 8 which extends from one side of the SUV 6 to the other. The luggage compartment 4 is commonly referred to as the "trunk" or "boot" of a vehicle. The bulkhead 8 has a first surface 10 and a second surface 12. Luggage and other items are typically loaded into the luggage compartment 4 by opening a hinged hatch or door at the rear of the SUV 6 to provide access to the luggage compartment 4.

The rear portion of the passenger compartment 2 includes a seating assembly 14 which is shown in a first configuration in FIG. 1. In the first configuration the first surface 10 of the bulkhead 8 faces the passenger compartment 2 and the second surface 12 faces the luggage compartment 4. The seating assembly 14 comprises a first seat 16 and a second seat 18. A separating portion 20 is located between the first seat 16 and the second seat 18.

Each seat 16, 18 comprises a seat cushion 22, a backrest 24, also known in the art as a squab, and a headrest 26. The separating portion 20 comprises a separating cushion 28 and a separating backrest 30 which may comprise an armrest. This is referred to in the art as a 40-20-40 split: the first seat 16 comprises 40% of the seating of the seating assembly 14, the separating portion 20 comprises 20% of the seating of the seating assembly 14 and the second seat 18 comprises 40% of the seating of the seating assembly 14. The backrests 24, 30 are located adjacent to the first surface 10 of the bulkhead 8.

Figure 2:
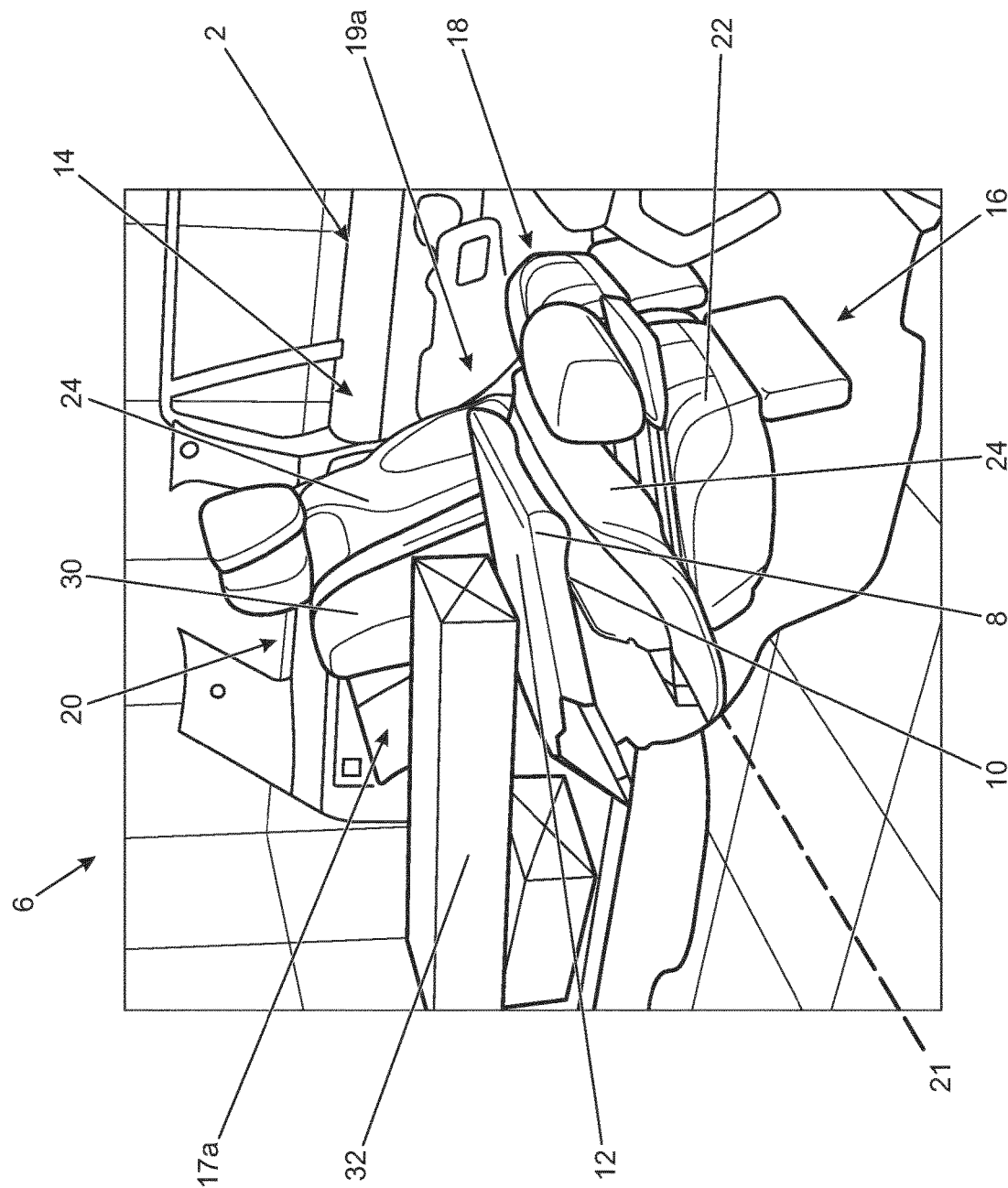
FIG. 2 is a schematic diagram of the luggage compartment and rear portion of the passenger compartment of the SUV shown in FIG. 1, wherein a minor portion of the rear seating arrangement is in a folded configuration.
Figure 3:
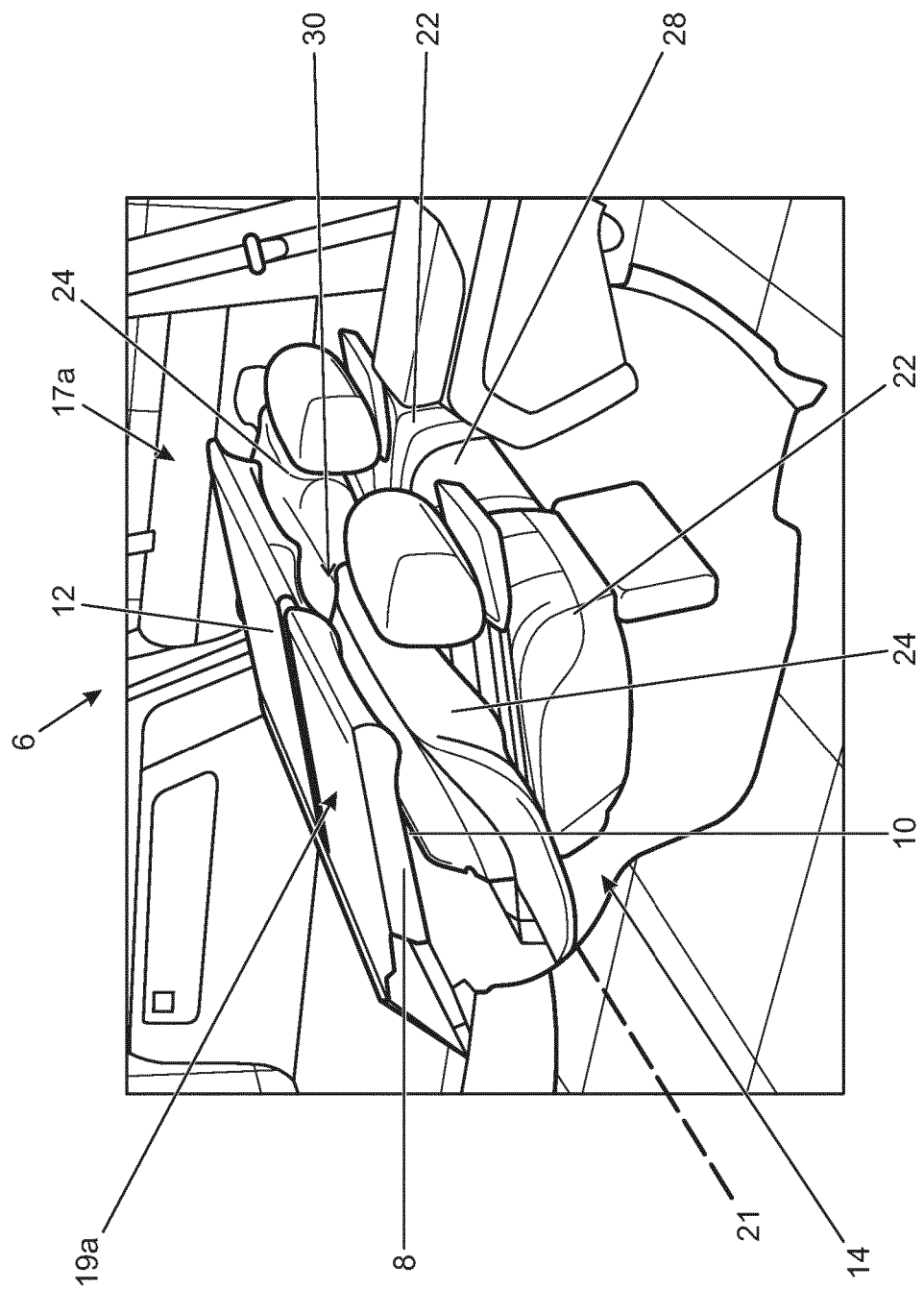
FIG. 3 is a schematic diagram of the luggage compartment and rear portion of the passenger compartment of the SUV shown in FIGS. 1 and 2, wherein the rear seating arrangement is in a folded configuration.

The bulkhead 8 is asymmetrically divided into a major bulkhead portion 17a and a minor bulkhead portion 19a, shown in FIGS. 2 and 3. Accordingly, the seating assembly 14 is divided into corresponding portions: a major portion 17 and a minor portion 19. The major portion 17 comprises the second seat 18, the separating portion 20 and the major bulkhead portion 17a. The minor portion 19 comprises the first seat 16 and the minor bulkhead portion 19a.

The seats 16, 18 and separating portion 20 are arranged so that the backrests 24, 30 may each fold forward about a folding axis 21 parallel to the plane of the bulkhead 8. The bulkhead 8 is also arranged to fold forward in cooperation with the seats 16, 18 and separating portion 20.

The seating assembly 14 is shown in FIG. 2 in a second configuration. In the second configuration the first seat 16 is in a folded configuration so that its backrest 24 rests on the seat cushion 22. In this configuration the minor bulkhead portion 19a is folded forward to lie on top of the backrest 24 so that the first surface 10 of the minor bulkhead portion 19a generally faces the floor of the passenger compartment 2 and the second surface 12 of the minor bulkhead portion 19a generally faces the roof of the passenger compartment 2. The second configuration allows a large load 32 to be carried by the SUV 6 while allowing the second seat 18 to carry a passenger.

The seating assembly 14 is shown in FIG. 3 in a third configuration. In the third configuration all the backrests 24, 30 are folded forward about the folding axis 21 so that each backrest 24, 30 rests on its corresponding cushion 22, 28. In the third configuration both the minor bulkhead portion 19a and major bulkhead portion 17a are folded forward to lie on top of the backrests 24, 30 so that the first surface 10 of the bulkhead 8 generally faces the floor of the passenger compartment 2 and the second surface 12 generally faces the roof of the passenger compartment 2. The third configuration allows a larger load (not shown) to be carried by the SUV 6.

Figure 4:
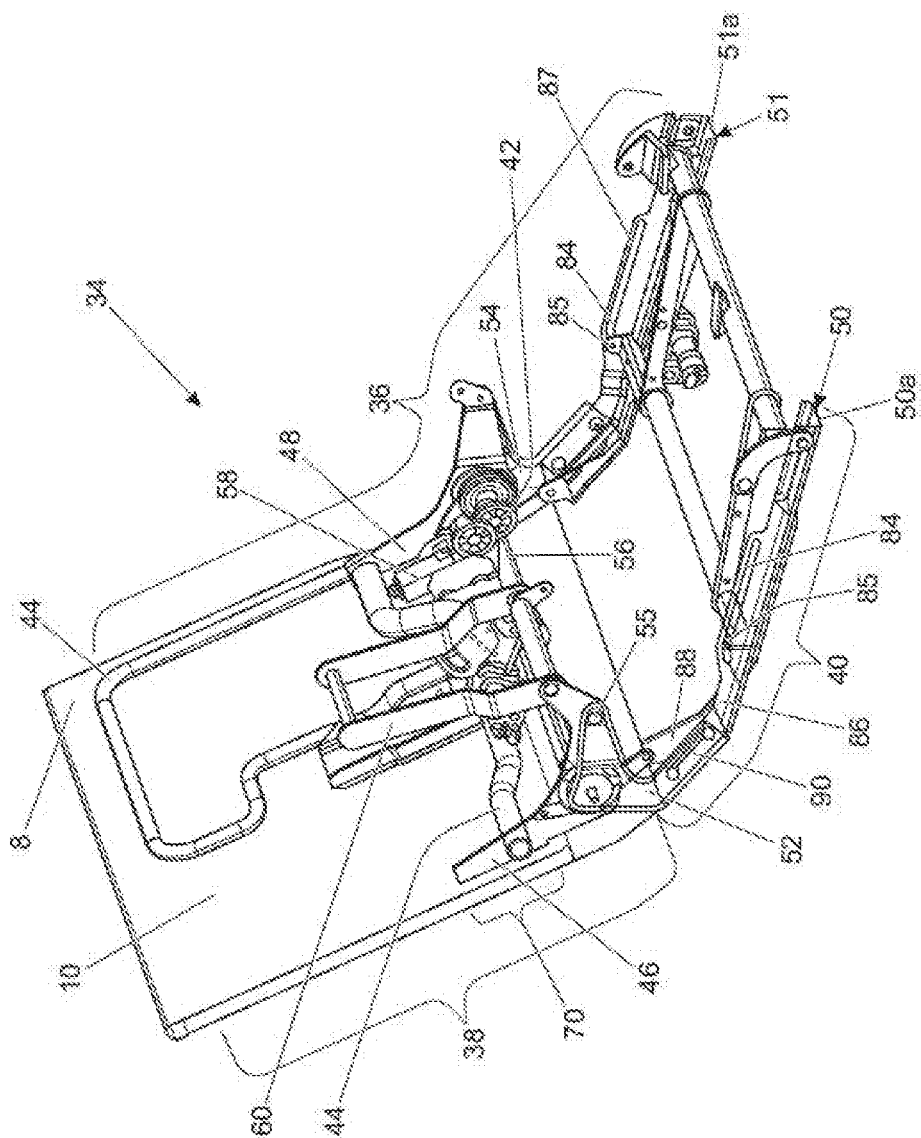
FIG. 4 is a schematic diagram which is a perspective view of the internal components of the major portion of a rear seating assembly according to an embodiment of the invention.

The seats 16, 18 and separating portion 20 of a seating assembly 14 are supported by a bulkhead assembly 34. The bulkhead assembly 34 is divided into a major portion and a minor portion corresponding to the major and minor portions described above. FIG. 4 shows the major portion of the bulkhead assembly 34 in an unfolded configuration. The apparatus and principles of operation described herein in respect of the major portion of the bulkhead assembly 34 are also applicable to the minor portion of the bulkhead assembly 34.

The bulkhead assembly 34 comprises a support structure 36. The support structure 36 comprises an upper support structure 38 and a lower support structure 40 which are connected by a powered linkage assembly 42. The powered linkage assembly 42 is arranged to reconfigure the bulkhead assembly 34 from a folded configuration to an unfolded configuration, and vice versa. As a consequence, the bulkhead assembly 34 reconfigures the seating assembly 14 between folded and unfolded configurations. The bulkhead assembly 34 also comprises a bulkhead 8.

As shown in FIG. 4, in an unfolded configuration the upper support structure 38 and the bulkhead 8 each generally forms an obtuse angle relative to the lower support structure 40.

The upper support structure 38 includes a frame 44 and a U-shaped first bulkhead bracket 46 and a U-shaped second bulkhead bracket 48. The planes of the bulkhead brackets are parallel. The frame 44 and bulkhead brackets 46, 48 are attached to the first surface 10 of the bulkhead 8. The lower support structure 40 comprises a first rail 50 and a second rail 51.

The first rail 50 comprises two parallel flanges: a first rail bracket flange 86 and a first connecting rod flange 88. The second rail 51 comprises two parallel flanges: a second rail bracket flange 87 and a second connecting rod flange 91. The first rail bracket flange 86 and the second rail bracket flange 87 each define a slot 84.

The seat cushion 22 comprises a support structure which has a pair of pins 85. One pin 85 fits into the slot 84 of the first rail bracket flange 86, and the other pin fits into the slot 84 of the second rail bracket flange 87. Each pin 85 is free to move in the slot 84. Accordingly, the slots 84 provide a seat cushion track on which a seat cushion 22 is mounted on the lower support structure 40, and the pin-and-slot arrangement allows the seat cushion 22 to be moved forwards and backwards relative to the lower support structure 40. In an alternative embodiment the pins 85 may be substituted with, or support, rotational members such as wheels, which may rest on rails which may be formed by the slots 84. The pins 85 act to support the seat cushion 22 between the first and second rails 50.

The first rail bracket flange 86 and the first connecting rod flange 88 are linked by a first rail horizontal portion 50a. The second rail bracket flange 87 and the second connecting rod flange 91 are linked by a second rail horizontal portion 51a. The first rail horizontal portion 50a and the second rail horizontal portion 51a are secured to the floor of the SUV 6.

A first rail bracket 52 extends from the first rail 50 and a second rail bracket 54 extends from the second rail 51. The first rail bracket 52 is pivotally coupled to the first bulkhead bracket 46 by a pivot 55. The second rail bracket 54 is pivotally coupled to the second bulkhead bracket 48. A driveshaft 56 extends between and is mounted in the bulkhead brackets 46, 48. The driveshaft 56 is powered by an electric motor 58, which the vehicle user operates using a control system 100 comprising a switch (shown in FIG. 1). The control system 100 may be part of the seat reclining system used for adjustment by the passenger of the backrest for comfort. The upper support structure 38 also comprises an armrest frame 60 arranged to support an armrest located in the backrest 30 of a separating portion 20.

Figure 5:
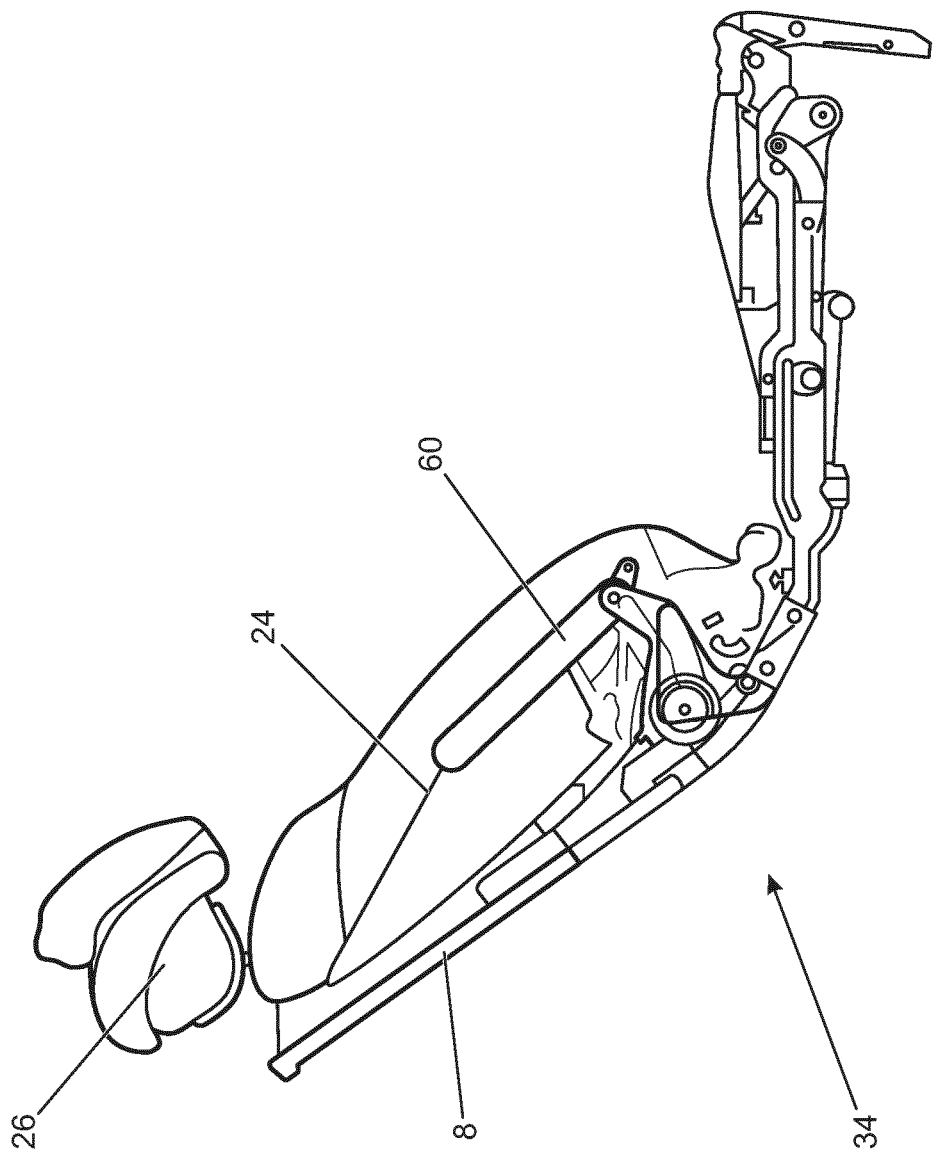
FIG. 5 is a schematic cutaway diagram which is a side view of the components of the major portion of the rear seating assembly of a car in an unfolded configuration according to an embodiment of the invention.

FIG. 5 is a cut-away schematic side view of the bulkhead assembly 34 shown in FIG. 4, which also shows the bulkhead assembly 34 supporting a headrest 26 and a backrest 24.

Figure 6:
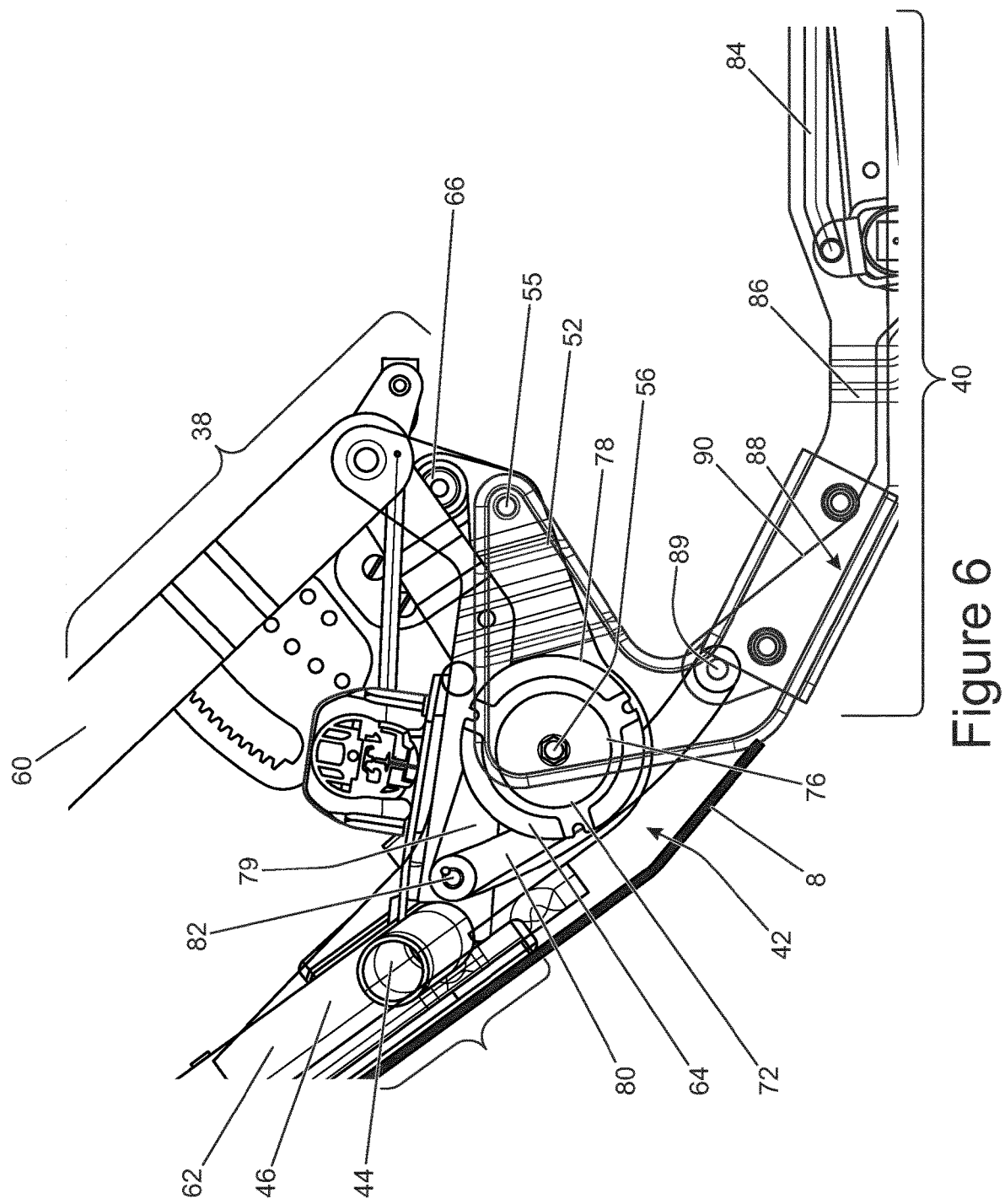
FIGS. 6 to 12 are schematic diagrams of the same view of a linkage of a rear seating assembly according to an embodiment of the invention, which illustrate the operation of the linkage from an unfolded state to a folded state.
Figure 7:
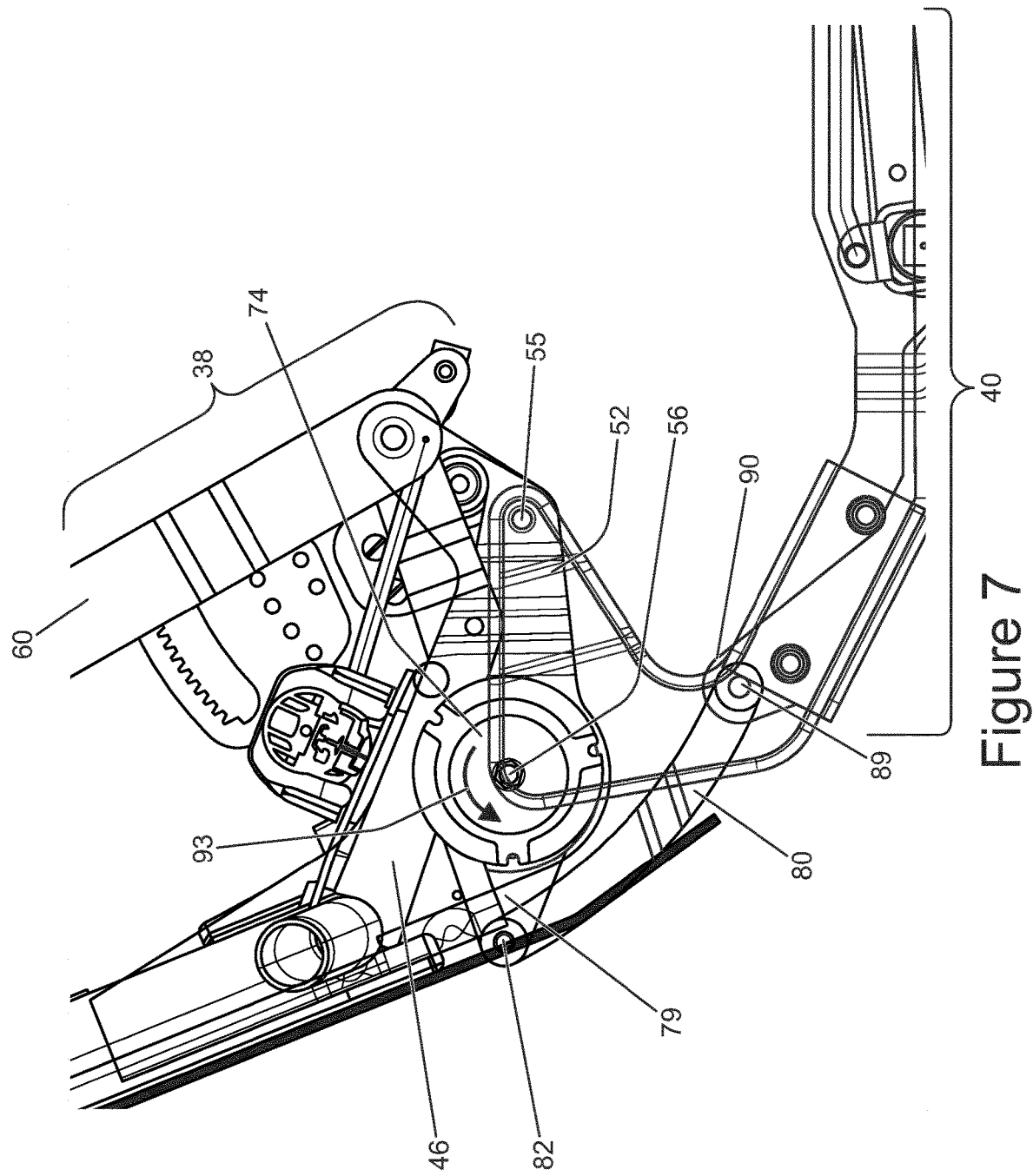
Figure 8:
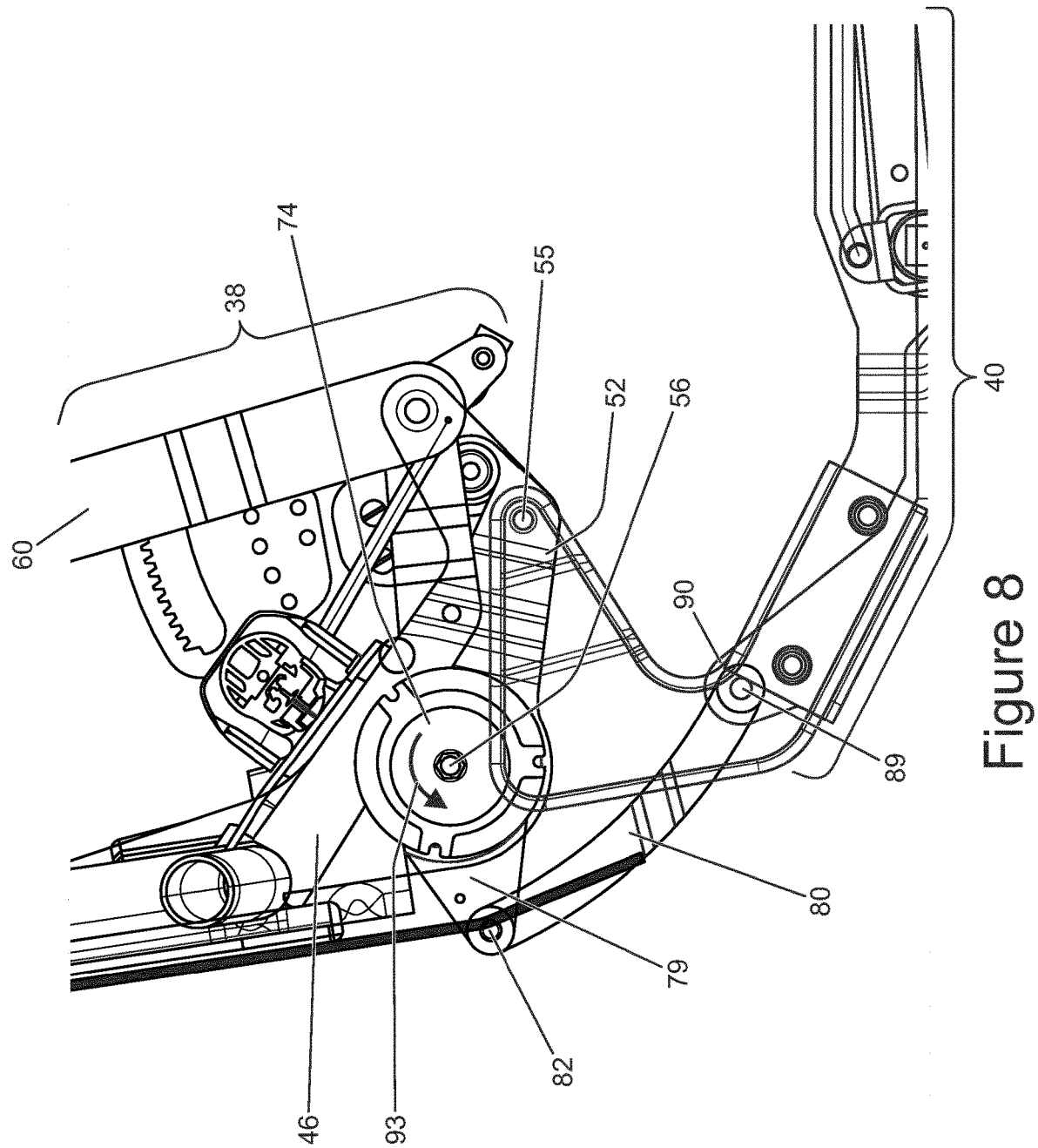
Figure 9:
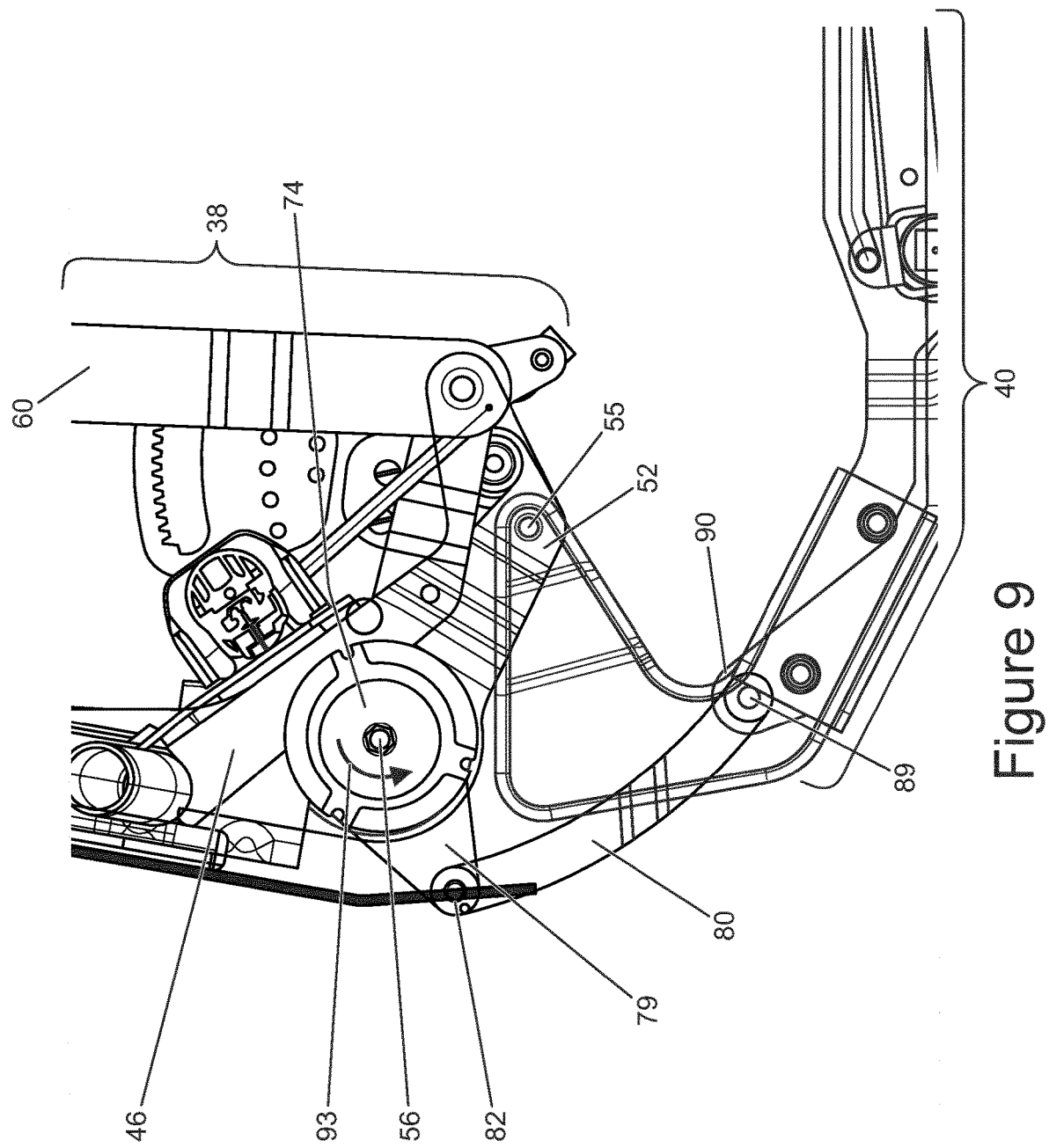
Figure 10:
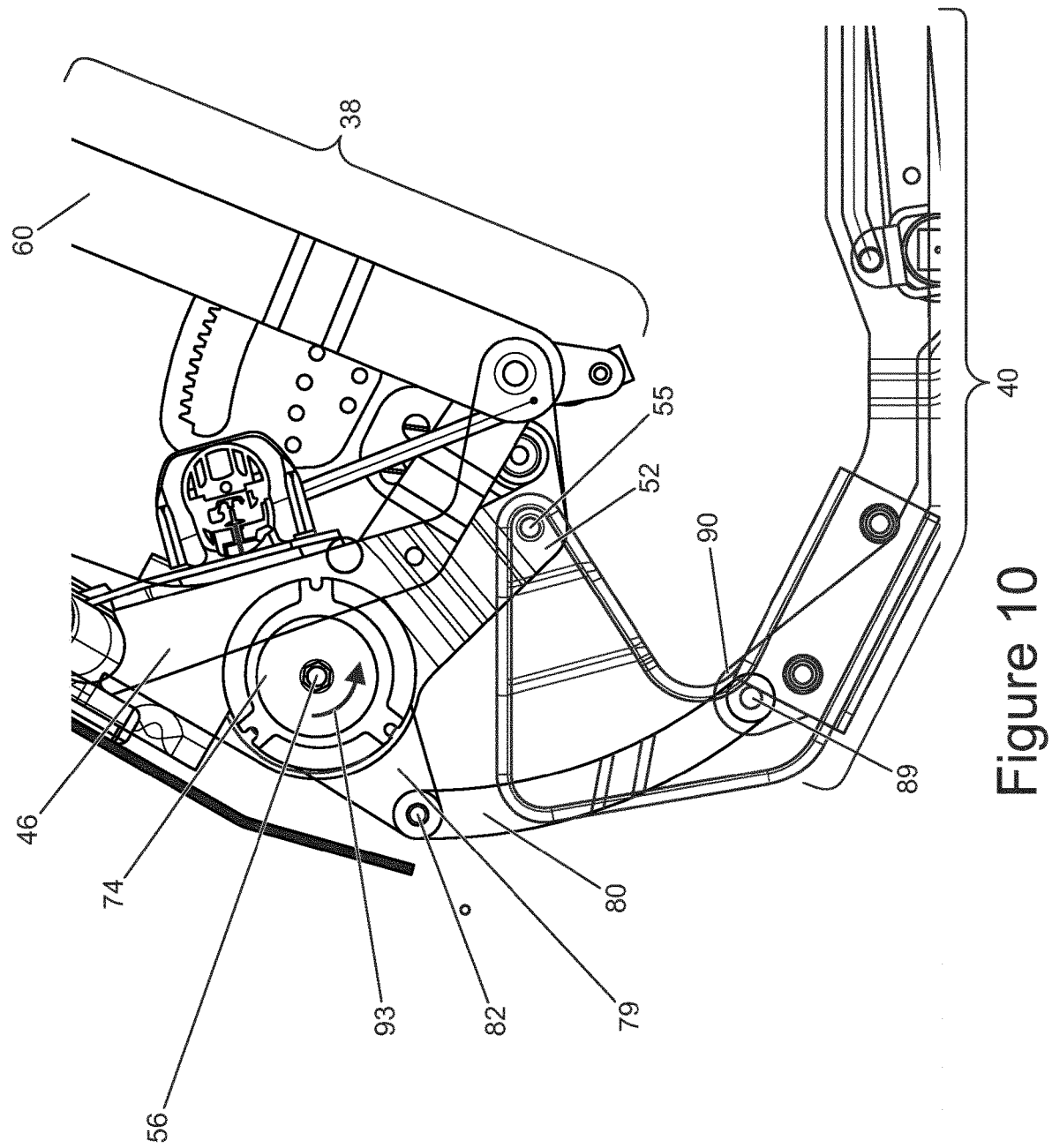
Figure 11:
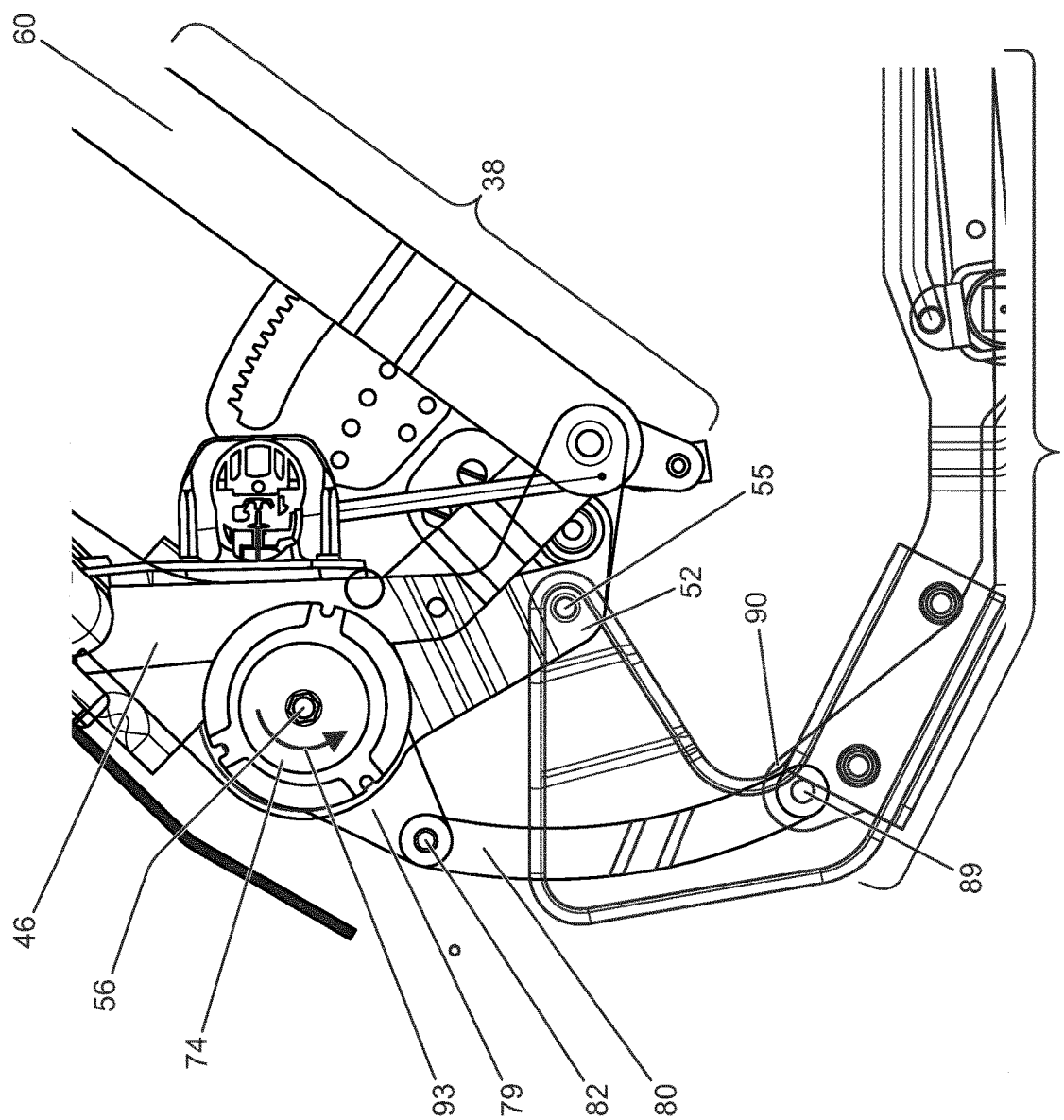
Figure 12:
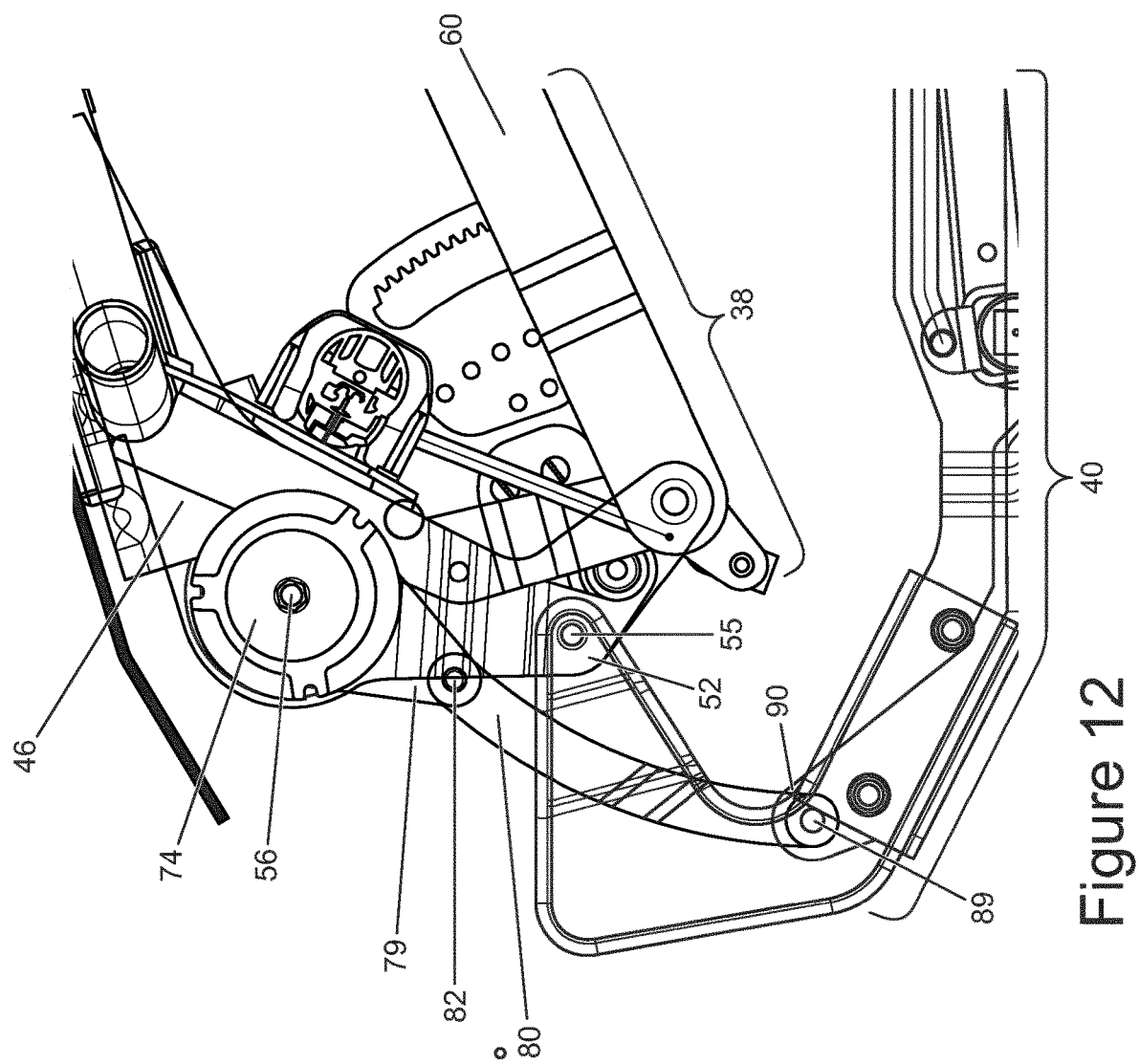

The linkage assembly 42 which enables each of the major and minor portions of the seating assembly 14 to move between an unfolded configuration and a folded configuration is shown in detail in FIGS. 6 to 12. FIGS. 6 to 12 also illustrate a method of operating the linkage 42 to switch from a fully unfolded configuration, as shown in FIG. 6, through intermediate stages of operation, as shown in FIGS. 7 to 11, to a fully unfolded configuration, as shown in FIG. 12.

FIGS. 6 to 12 are close up views of the upper support structure 38 and the lower support structure 40 connected by the linkage assembly 42. The first bulkhead bracket 46 has generally planar U-shape with a first arm portion 62, a middle portion 64 and a second arm portion 66. The second bulkhead bracket 48 (shown in FIG. 4) has a shape and configuration identical to the first bulkhead bracket 46, and its configuration with the second rail bracket 54 is substantially the same as described herein.

The first arm portion 62 of the first bulkhead bracket 46 is longer than the second arm portion 66 of the first bulkhead bracket 46. The first arm portion 62 has an expanded width portion 70. The expanded width portion 70 of the first arm portion 62 is attached to the first surface 10 of the bulkhead 8 so that the plane of the first bulkhead bracket 46 is perpendicular to the first surface 10 of the bulkhead 8. The bulkhead frame 44 is attached to the first arm portion 62 of the first bulkhead bracket 46.

The middle portion 64 of the first bulkhead bracket 46 has a bore 72 through which the driveshaft 56 extends perpendicular to the plane of the first bulkhead bracket 46. As mentioned above, the driveshaft 56 extends from the first bulkhead bracket 46 to the second bulkhead bracket 48 where it is powered by an electric motor 58.

An engagement member 74 is mounted coaxially with the driveshaft 56. The engagement member 74 is generally in the form of a disk and comprises a first radius portion 76 which has a size and shape that complements the radius of the bore 72 which receives the engagement member 74 to form a rotating pivot portion in the first bulkhead bracket 44. The engagement member 74 comprises a second radius portion 78 which is coaxial with the first radius portion 76 and the driveshaft 56.

The second radius portion 78 is mated to an elongate portion 79 in the form of a lobe. A first end of a connecting member in the form of a curved connection rod 80 is pivotally connected to the elongate portion 79 by a pivot 82. The elongate portion 79 forms a crank mounted on the driveshaft 56 adjacent to the inner surface of the first bulkhead bracket 46.

The first bulkhead bracket 46 is pivoted with respect to the first rail bracket 52 around the pivot 55 which extends through the first bulkhead bracket 46 where the second arm portion 66 of the first bulkhead bracket 46 meets the middle portion 64 of the first bulkhead bracket 46.

FIGS. 6 to 12 show the first rail bracket flange 86 of the first rail 50 and first rail bracket 52 of the lower support structure 40. The first rail bracket 52 is attached to the first rail bracket flange 86 by an attachment plate 90, and the second end of the connecting rod 80 is pivotally attached to the connecting rod flange 88 by a pivot 89.

In order to change the configuration of the bulkhead assembly 34 from an unfolded configuration, as shown in FIG. 6, to a folded configuration, as shown in FIG. 12, the armrest frame 60 must be in the stowed position, as shown in the figures. Power is then supplied to the electric motor 54 to rotate the driveshaft 56. As viewed in FIGS. 6 to 12, to change the configuration of the bulkhead assembly 34 from the unfolded configuration to the folded configuration the electric motor 54 drives the driveshaft 56 so that driveshaft 56 rotates anticlockwise about its longitudinal axis. Alternatively, the configuration of the bulkhead assembly 34 may be transformed from the folded configuration to the unfolded configuration by rotation of the driveshaft 56 by the electric motor 54 in a clockwise direction about the longitudinal axis of the driveshaft 56, as viewed in FIGS. 6 to 12.

As viewed in FIGS. 6 to 12, when the driveshaft 56 rotates anticlockwise along its longitudinal axis, as indicated by arrow 93 the elongate portion 79 pushes against the connecting rod 80. Since the connecting rod 80 is fixed to the elongate portion 79 and is fixed to the connecting rod flange 88 so that it cannot move along its longitudinal axis with respect to the pivots 82, 89, the engagement member 74 is urged to rotate in the bore 72 of the first bulkhead bracket 46. This action forces the first bulkhead bracket 46 to move about the pivot 55 relative to the first rail bracket 52. As a consequence the upper support structure 38 rotates forward about the pivot 55 towards the lower support structure 40.

Rotation of the driveshaft 56 continues to urge the upper support structure 38 forwards about the pivot 55. As can be seen in FIGS. 6 to 12, the elongate portion 79 moves from approximately a ten o'clock position in FIG. 6 to approximately a seven o'clock position in FIG. 12. FIG. 12 illustrates the final position of the bulkhead assembly 34 in a folded configuration.

FIGS. 13a to 13e are side views of a bulkhead assembly 34 and a seating assembly 14 according to an embodiment of the invention. Each of FIGS. 13a to 13e show the bulkhead assembly 34 and the seating assembly 14 in different configurations which illustrate a method of operation of the invention. Features shown in FIGS. 13a to 13e which correspond to features of the previous embodiments are given the same reference numerals.

The bulkhead assembly 34 comprises a bulkhead 8 which is mounted to a first bulkhead bracket 46. The seating assembly comprises a seat cushion 22, a backrest 24 and a headrest 26 to form a seat 16. The seat cushion 22 is mounted on a lower support structure 40. The backrest 24 is pivotally mounted on a pivoting member 92 to allow the angle of the backrest 24 relative to the seat cushion 22 to be altered by a passenger for comfort. The backrest 24 is shown in a forward position in FIG. 13a. In this position a void 94 is defined between the backrest 24 and the bulkhead 8. The lower support structure 40 is connected to an upper support structure 38, as described in the preceding embodiments.

As described previously, the bulkhead assembly 34 may be reconfigured between a folded configuration and an unfolded configuration. The reconfiguration may be activated using a control system 100 comprising a switch (shown in FIG. 1) which controls an electric motor 58 (not shown in FIGS. 13a to 13e). The control system 100 may be part of the seat reclining system used to adjust the backrest 24 relative to the seat cushion 22.

Figure 13A:
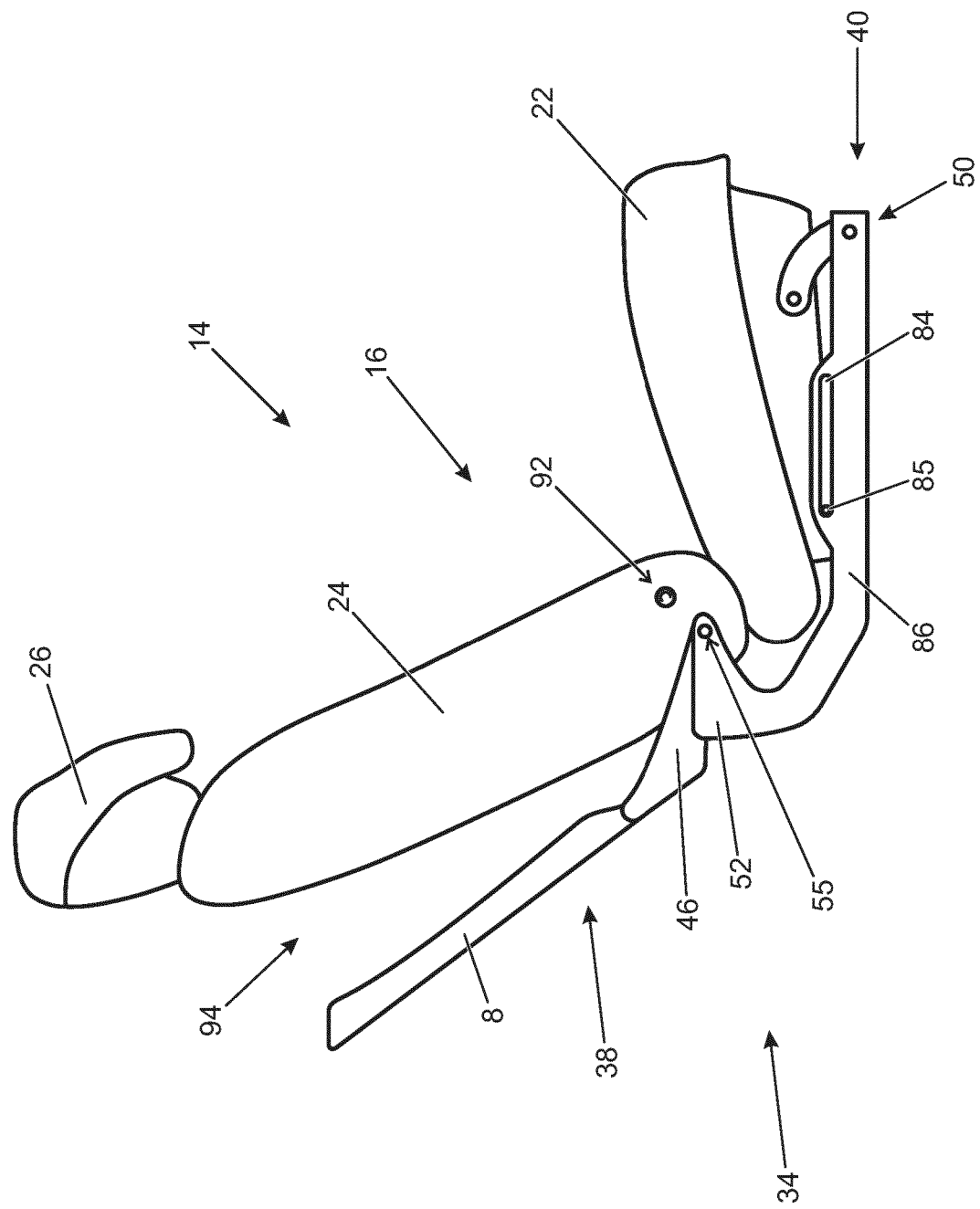
Figure 13B:
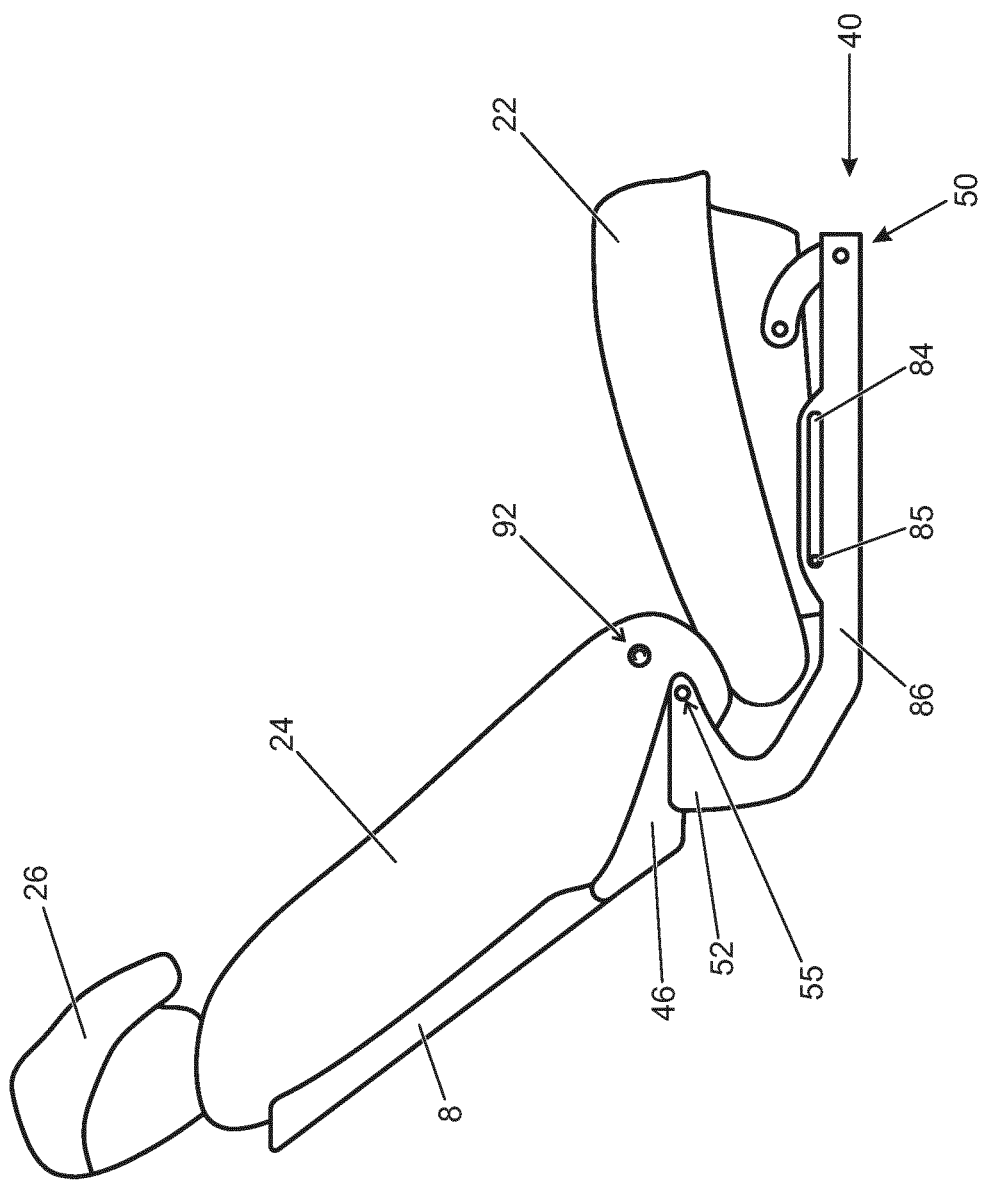

On activation of the control system 100, the backrest 24 automatically reclines to a rearward position in which the void 94 is eliminated and the backrest 24 abuts the bulkhead 8, as shown in FIG. 13b. The abutting position is an initial position that the backrest 24 may take to ensure that the bulkhead assembly 34 is in the correct position to be reconfigured from the unfolded configuration to the folded configuration.

Figure 13C:
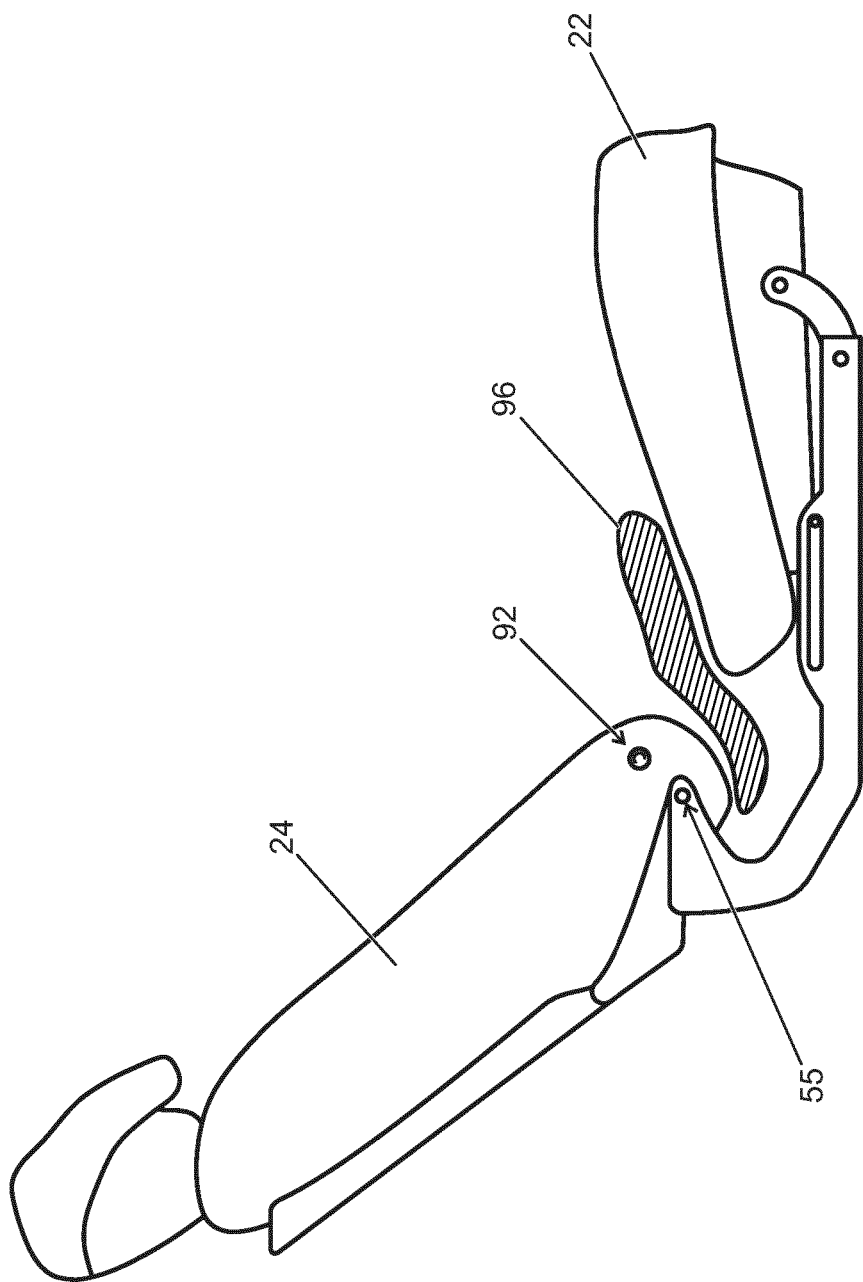

Using a pin-and-slot arrangement, the seat cushion 22 may be moved forward with respect to the lower support structure 40, as shown in FIG. 13c. The forward position of the seat cushion 22 provides further space indicated by the shaded area 96 for the backrest 24 to pivot into.

FIG. 13d illustrates the present embodiment of the invention when it is between the unfolded configuration and the folded configuration.

Figure 13E:
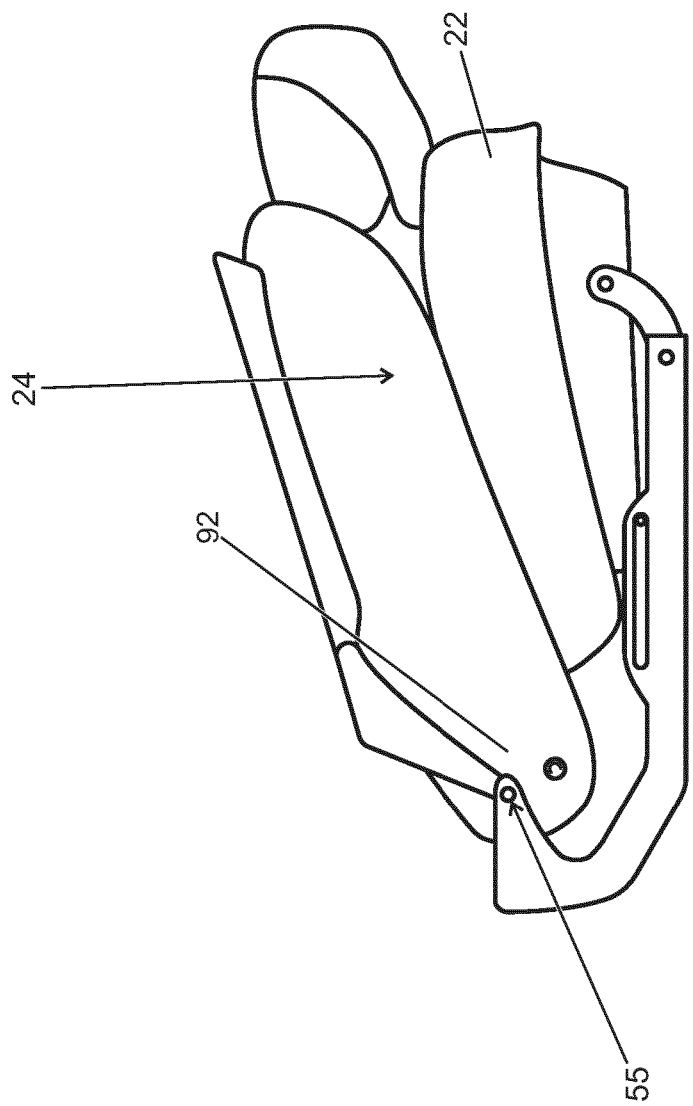

FIG. 13e illustrates the components of the major portion of a bulkhead assembly 34 in a folded configuration once the operation of the motor 58 is completed. In the folded configuration, a portion of the backrest 24 fills the shaded area 96 shown in FIG. 13c.

Although particular embodiments of the invention have been disclosed herein in detail, this has been done by way of example and for the purposes of illustration only. The aforementioned embodiments are not intended to be limiting with respect to the scope of the appended claims, which follow. It is contemplated by the inventors that various substitutions, alterations, and modifications may be made to the invention without departing from the scope of the invention as defined by the claims.

The invention claimed is:

1. A rear seating assembly for a passenger vehicle, wherein the rear seating assembly comprises a bulkhead, a seat having a backrest, and a powered linkage assembly for reconfiguring the rear seating assembly between a folded configuration and an unfolded configuration; wherein in the unfolded configuration the bulkhead is located between a passenger compartment and a luggage compartment of the passenger vehicle with a first surface of the bulkhead facing the passenger compartment and the backrest is movable with respect to the bulkhead between a rearward position in which the first surface of the bulkhead is adjacent the backrest and a forward position in which a void is defined between the first surface of the bulkhead and the backrest, and wherein in the folded configuration the bulkhead and the backrest are folded forward with the first surface of the bulkhead generally facing a floor of the passenger compartment.

2. The rear seating assembly according to claim 1, wherein the rear seating assembly comprises one or both of an upper support structure and a lower support structure.

3. A bulkhead assembly for a passenger vehicle, wherein the bulkhead assembly comprises a bulkhead, both a lower support structure and an upper support structure, and a powered linkage assembly for reconfiguring the bulkhead assembly between a folded configuration and an unfolded configuration; wherein in the unfolded configuration the bulkhead is located between a passenger compartment and a luggage compartment of the passenger vehicle with a first surface of the bulkhead facing the passenger compartment, and in the folded configuration the first surface of the of the bulkhead is folded towards a floor of the passenger compartment, and further wherein one or both of the upper support structure and the bulkhead have first positions relative to the lower support structure in the folded configuration, and one or both of the upper support structure and the bulkhead have second positions relative to the lower support structure in the unfolded configuration.

4. The bulkhead assembly according to claim 3, wherein the upper support structure and the lower support structure are pivotally coupled.

5. The bulkhead assembly according to claim 3, wherein the powered linkage assembly is arranged to reconfigure the relative positions of one or both of the upper support structure and the bulkhead with respect to the lower support structure.

6. A bulkhead assembly for a passenger vehicle, wherein the bulkhead assembly comprises a bulkhead, one or both of an upper support structure and a lower support structure, and a powered linkage assembly for reconfiguring the bulkhead assembly between a folded configuration and an unfolded configuration; wherein in the unfolded configuration the bulkhead is located between a passenger compartment and a luggage compartment of the passenger vehicle with a first surface of the bulkhead facing the passenger compartment, and in the folded configuration the first surface of the bulkhead is folded towards a floor of the passenger compartment, and further wherein the powered linkage assembly comprises an engagement member engaged with the upper support structure or the lower support structure.

7. The bulkhead assembly according to claim 6, wherein the engagement member comprises a first radius portion engaged with a complementary receiving portion in the upper support structure or the lower support structure.

8. The bulkhead assembly according to claim 6, wherein the engagement member comprises a second radius portion.

9. The bulkhead assembly according to claim 6, wherein the engagement member comprises an elongate portion.

10. The bulkhead assembly according to claim 6, wherein the bulkhead assembly comprises both the lower support structure and the upper support structure, and wherein a connecting member connects the engagement member to the lower support structure or the upper support structure.

11. The bulkhead assembly according to claim 10, wherein the connecting member and the engagement member are arranged to adjust the position of the lower support structure and the upper support structure relative to each other.

12. The bulkhead assembly according to claim 10, wherein the engagement member cranks the connecting member to adjust the relative position of the lower support structure and the upper support structure.

13. The bulkhead assembly according to claim 10, wherein the connecting member is pivotally connected to the engagement member.

14. The rear seating assembly according to claim 1, wherein the powered linkage assembly comprises a driveshaft.

15. The rear seating assembly according to claim 14, wherein rotation of the driveshaft in one direction switches the rear seating assembly from the folded configuration to the unfolded configuration, and rotation of the driveshaft in the other direction switches the rear seating assembly from the unfolded configuration to the folded configuration.

16. The rear seating assembly according to claim 1, wherein the powered linkage comprises a motor arranged to drive the linkage.

17. The rear seating assembly according to claim 16, wherein the motor is an electric motor.

18. A control system for controlling the rear seating assembly according to claim 1, the control system configured to control the powered linkage assembly to reconfigure the rear seating assembly between the folded configuration and the unfolded configuration.

19. A vehicle comprising a rear seating assembly according to claim 1.

* * * * *